Patented Feb. 22, 1949

2,462,407

UNITED STATES PATENT OFFICE 2,462,407

REACTION PRODUCTS OF 3-HEXENEDINI-
TRILE AND CERTAIN ALDEHYDES

Carl M. Langkammerer, Wilmington, Del., assignor to E. I. du Pont de Nemours & Company, Wilmington, Del., a corporation of Delaware No Drawing. Application June 16, 1948, Serial No. 33,442

10 Claims. (Cl. 260—345)

This invention relates to a new class of organic compounds having nitrile groups. More particularly, it relates to certain substituted 3-hexenedinitriles.

U. S. Patent 2,342,101 discloses and claims as a new product beta-dihydromucononitrile,

This material, which may also be called 1,4-dicyano-2-butene or 3-hexenedinitrile, has assumed considerable technical importance, particularly since it can be hydrogenated to hexamethylenediamine, a major component of one of the principal nylons. The discovery of 3-hexenedinitrile aroused interest in its heretofore unknown substitution products, which would be expected to offer many scientific and technical possibilities. There was, however, no known method of substituting 3-hexenedinitrile which would leave the double bond and the nitrile groups unaffected.

It is an object of this invention to provide a new class of organic compounds having nitrile groups. A further object of this invention is to provide new substituted 3-hexenedinitriles. A still further object is to provide a method of substituting the 1,4-dicyanobutenes which leaves the nitrile groups unaffected and does not remove the double bond. Other objects will appear hereinafter.

These objects are accomplished by providing a new class of chemical compounds, the monomeric condensation products of one mole of a 1,4-dicyanobutene with two moles of an aldehyde having a double bond conjugated with the carbonyl group. The process of preparing these new compounds comprises reacting, in the presence of an alkali metal alkoxide catalyst, an aldehyde having a double bond conjugated with the carbonyl group with a 1,4-dicyanobutene, i. e., 1,4-dicyano-2-butene or 1,4-dicyano-1-butene. These new products are 3-hexenedinitriles having attached to the carbon atoms in the 2- and 5-positions through a double bond, a methylidyne, =CH—, group whose remaining valence is attached to a substituent having a carbon-to-carbon double bond conjugated with that of the methylidyne group. These compounds have the formula

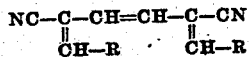

wherein R is the non-oxo portion of an aldehyde having a carbon-to-carbon double bond conjugated with the carbonyl group. Thus included within this invention are the 2,5-di-alkylidene-3-hexenedinitriles and the 2,5-di-aralkylidene-3-hexenedinitriles where in each of these classes of compounds there is a methylidyne group attached through a double bond to the carbon atoms in the 2- and 5-positions and also a carbon-to-carbon double bond conjugated with that of the methylidyne group.

Either of the 1,4-dicyanobutenes (hexenedinitriles) may be used as the starting material, or their mixtures in any proportions. In either case the same condensation product results. 1,4-dicyano-2-butene may be prepared by the method of U. S. Patent 2,342,101, or by the improved methods described in applications Ser. No. 768,283; 768,703 or 768,705. 1,4-dicyano-1-butene is conveniently prepared by isomerization of 1,4-dicyano-2-butene, which may be done, according to application Ser. No. 756,097, filed by G. F. Hager on June 20, 1947 now Patent No. 2,451,386 patented October 12, 1948, by maintaining 1,4-dicyano-2-butene at elevated temperatures, e. g., between 60 and 150° C., in the presence of a hydrogenating metal such as copper or cobalt, until the 1,4-dicyano-1-butene has formed in substantial amounts. The product is obtained as a mixture of the cis and trans isomers, which can be separated by fractional distillation, although separation is unnecessary for the purpose of this invention.

The reaction is preferably carried out by dissolving the 1,4-dicyanobutene and the aldehyde to be reacted with it in a suitable alcohol such as methanol, ethanol, isopropyl alcohol, butyl alcohol, etc., and adding to the solution a catalytic amount of an alkali metal alkoxide, e. g., lithium, sodium or potassium alkoxide, which need not necessarily be an alkoxide of the same alcohol used as solvent. There may be used as little as 0.02 atom of alkali metal per mole of dicyanobutene, or as much as 0.5 atom or more. The dicyanobutene and the aldehyde are preferably used in at least equivalent proportions, that is, two moles of aldehyde per mole of dicyanobutene. It is often desirable to use an excess of the aldehyde, e. g., up to 100% molar excess, to repress as much as possible the competing reaction whereby the alcohol adds to the double bond of the dicyanobutene.

The reaction is in general exothermic and it is therefore preferably carried out at low to moderate temperatures, e. g., between —10 and 50° C., although with the less reactive aldehydes it may be desirable to heat the reaction mixture up to 100° C. or higher. The reaction product is in general a crystalline solid which separates from the solution and can be isolated by filtration, followed by recrystallization if desired. In addition to the competing reaction, already referred to, which leads to formation of beta-alkoxyadiponitriles, there may be formed a certain amount of resinous by-products, so that the yields of the desired substituted 3-hexenedinitrile may vary rather widely, depending on the reactivity of the aldehyde.

The invention is illustrated in greater detail in the following examples, in which parts are by weight.

Example I

A solution of 63 parts of benzaldehyde and 21.4 parts of 1,4-dicyano-2-butene in 200 parts of absolute ethanol was treated with a solution of 2.3 parts of metallic sodium in 68 parts of absolute ethanol, added gradually so that the heat effect due to addition of a portion of the catalyst was dissipated before another portion was added. After all the sodium ethoxide solution had been added, the solution was stirred at room temperature for several hours and allowed to stand for 16 hours. Filtering the solution gave 25.3 parts of 2,5-dibenzylidene-3-hexenedinitrile, a bright yellow crystalline solid melting at 246–248° C.

Anal.—Calcd. for $C_{20}H_{14}N_2$: C, 85.1; H, 4.97; N, 9.9; molecular wt., 282. Found: C, 83.99; H, 5.04; N, 9.65; molecular wt., 281.

When this experiment was repeated under similar conditions, but using trans-1,4-dicyano-1-butene instead of 1,4-dicyano-2-butene, the same reaction product was obtained, as identified by melting point and mixed melting point.

Example II

A solution of 74.4 parts of p-tolualdehyde and 21.4 parts of 1,4-dicyano-2-butene in 200 parts of absolute ethanol was treated gradually with a solution of 1 part of metallic sodium in 20 parts of absolute ethanol, interrupting the addition as needed to permit the considerable heat of reaction to dissipate. The reaction mixture was then stirred for 2 hours and allowed to stand for 16 hours. Filtration gave 20.2 parts of 2,5-di-p-methylbenzylidene-3-hexenedinitrile, a bright yellow crystalline solid which, after recrystallization from xylene, melted at 265–268° C.

Anal.—Calcd. for $C_{22}H_{18}N_2$: C, 85.16; H, 5.80; N, 9.03. Found: C, 84.61; H, 5.73; N, 9.1.

Example III

A solution of 20.4 parts of anisaldehyde and 5.3 parts of 1,4-dicyano-2-butene in 50 parts of absolute ethanol was treated with 17 parts of a 10% sodium ethoxide solution. After standing for 24 hours at room temperature, the reaction product was filtered off. It consisted of 7.21 parts of 2,5-di-o-methoxybenzylidene-3-hexenedinitrile. This was a yellow solid which, after recrystallization from xylene, melted at 248–251° C.

Anal.—Calcd. for $C_{22}H_{18}O_2N_2$: C, 77.5; H, 5.24; N, 8.09. Found: C, 76.93; H, 5.24; N, 8.12.

Example IV

To a solution of 16.5 parts of sodium benzaldehyde-o-sulfonate and 2.65 parts of 1,4-dicyano-2-butene in a mixture of 50 parts of absolute ethanol and 15 parts of water was added 8.5 parts of a 10% sodium ethoxide solution, and the reaction mixture was allowed to stand for 48 hours at room temperature. There was obtained 8.2 parts of the pale yellow sodium salt of 2,5-di-o-sulfobenzylidene-3-hexenedinitrile. Recrystallized from water the bright yellow monohydrate, which did not melt at 315°, was obtained.

Anal.—Calcd. for $C_{20}H_{12}O_6N_2S_2Na_2H_2O$: C, 47.6; H, 2.8; N, 5.5. Found: C, 47.7; H, 3.16; N, 5.45.

Example V

A solution of 22.6 parts of meta-nitrobenzaldehyde and 5.3 parts of 1,4-dicyano-2-butene in 50 parts of absolute ethanol was treated with 17 parts of a 10% sodium ethoxide solution. After standing for 7 days at room temperature there was obtained by filtration 16.3 parts of 2,5-di-m-nitrobenzylidene-3-hexenedinitrile.

Example VI

A solution of 22.4 parts of p-dimethylaminobenzaldehyde and 5.3 parts of 1,4-dicyano-2-butene in 50 parts of absolute ethanol was treated with 17 parts of 10% sodium ethoxide solution and the reaction mixture was allowed to stand for 48 hours at room temperature. There was obtained 6.3 parts of 2,5-di-p-dimethylaminobenzylidene-3-hexenedinitrile, a bright red solid which after recrystallization from xylene melted at 307–310° C.

Anal.—Calcd. for $C_{24}H_{24}N_4$: C, 78.3; H, 6.6; N, 15.2. Found: C, 77.9; H, 6.78; N, 15.11.

Example VII

To a solution of 115.2 parts of furfuraldehyde and 42.8 parts of 1,4-dicyano-2-butene in 400 parts of absolute ethanol was added dropwise a solution of 2.3 parts of metallic sodium in 68 parts of ethanol, discontinuing the addition at intervals to permit the heat effect to subside. The reaction mixture was then allowed to stand for 16 hours at room temperature and filtered. There was obtained 51.2 parts of 2,5-di-furfurylidene-3-hexenedinitrile, an orange-red solid which, after recrystallization from xylene, melted at 225–227° C.

Anal.—Calcd. for $C_{16}H_{10}O_2N_2$: C, 73.28; H, 3.82. Found: C, 73.47; H, 4.03.

Example VIII

A solution of 105 parts of crotonaldehyde and 53 parts of 1,4-dicyano-2-butene in 250 parts of absolute ethanol was treated with a solution of 1 part of metallic sodium in 30 parts of ethanol. When the heat effect had subsided, which required about 2 hours, the reaction mixture was filtered. There was obtained 27 parts of 2,5-di-crotonylidene-3-hexenedinitrile, which after two recrystallizations from absolute alcohol melted at 154–155° C.

Anal.—Calcd. for $C_{14}H_{16}N_2$: N, 13.35. Found: N, 13.11.

Example IX

A solution of 44.6 parts of cinnamaldehyde and 18 parts of 1,4-dicyano-2-butene in 200 parts of absolute ethanol was treated dropwise with a solution of 1 part of metallic sodium in 30 parts of absolute ethanol, discontinuing the addition at intervals to permit the heat effect to subside. After the reaction mixture had been allowed to stand for 16 hours at room temperature, it was filtered, giving 29 parts of 2,5-di-cinnamylidene-3-hexenedinitrile. After recrystallization from xylene this material melted at 245–246° C.

Anal.—Calcd. for $C_{24}H_{18}N_2$: C, 86.3; H, 5.45; N, 8.38. Found: C, 85.66; H, 5.59; N, 8.16.

There may be used in the process of this invention any aldehyde having a carbon-to-carbon double bond conjugated with the carbonyl group, such as aromatic, aliphatic, cycloaliphatic or heterocyclic aldehydes, including, in addition to those used in the examples, acrolein, citral, alpha- and beta-methylcrotonaldehyde, 1-cyclohexenyl aldehyde, piperonal, naphthaldehyde, anthraldehyde, alpha-pyrrolaldehyde, alpha-thiophenaldehyde and the like. Thus, the compounds of this invention include, in addition to those shown in the example, 3-hexenedinitriles having in the 2- and 5-positions groups such as acrylidene, citrylidene, alpha-methylcrotonylidene, beta-methylcrotonylidene, 1-cyclohexenylidene, piperonylidene, naphthylidene, anthrylidene, alpha-pyrrylidene, alpha-thienylidene and the like. The aldehydes suitable for this invention may bear various substituents such as the alkoxy, aryloxy, sulfo, halo, nitro, amino, dialkylamino, hydroxy, thio, carboxy, carbalkoxy etc., groups, including groups which under certain conditions react with the dicyanobutenes, since the reaction of the aldehyde groups is rapid and leads to substantial amounts of compounds of the type described even when competing reactive groups are present. Thus, the only important portion of the molecule from the standpoint of this reaction is the aldehyde group conjugated with an ethylenic double bond. The preferred materials, because of their greater ease of formation and of separation from the reaction mixture, are the 3-hexenedinitriles having in the 2- and 5-positions, substituents of from 3 to 18 carbon atoms, and preferably alkylidene or aralkylidene substituents.

The products of this invention are useful as intermediates in the synthesis of many chemicals through the reactions of the nitrile groups and of the unsaturated linkages. For example, they may be hydrogenated partly or completely, thus leading to saturated nitriles or to saturated or unsaturated diamines; or they may be hydrolyzed to diamides or dicarboxylic acids. The products thus obtained are in turn useful as polyamide intermediates, plasticizer intermediates, dyestuff intermediates, etc. As has already been noted, the products of this invention, in particular those having aralkylidene substituents, are highly colored. They contain a new chromophoric system of conjugated double bonds, and they are therefore useful as dyestuffs per se, for example, as dispersion colors for cellulose acetate.

As many apparently widely different embodiments of this invention may be made without departing from the spirit and scope thereof, it is to be understood that this invention is not limited to the specific embodiments thereof except as defined in the appended claims.

I claim:
1. A 3-hexenedinitrile having a methylidyne group attached through a double bond to the carbon atom in the 2-position and another methylidyne group attached through a double bond to the carbon atom in the 5-position, the remaining valence of each of said methylidyne groups being attached to separate carbon atoms which have a carbon-to-carbon double bond conjugated with that of the methylidyne group.
2. A 2,5-di-aralkylidene-2-hexenedinitrile having a carbon-to-carbon double bond conjugated with that of the methylidyne group.
3. 2,5-di-benzylidene-3-hexenedinitrile.
4. A 2,5-dialkylidene-3-hexenedinitrile having a carbon-to-carbon double bond conjugated with that of the methylidyne group.
5. 2,5-di-furfurylidene-3-hexenedinitrile.
6. The method which comprises reacting in the presence of an alkali metal alkoxide catalyst a 1,4-dicyanobutene with an aldehyde having a double bond conjugated with the carbonyl group.
7. The method as set forth in claim 6 in which the aldehyde is an aromatic aldehyde having a double bond conjugated with the carbonyl group.
8. The method as set forth in claim 6 in which the aldehyde is an aliphatic aldehyde having a double bond conjugated with the carbonyl group.
9. The method which comprises reacting in the presence of a sodium alkoxide catalyst a 1,4-dicyanobutene with benzaldehyde.
10. The method which comprises reacting in the presence of an alkali metal alkoxide catalyst a 1,4-dicyanobutene with furfuraldehyde.

CARL M. LANGKAMMERER.

No references cited.

Certificate of Correction

Patent No. 2,462,407. February 22, 1949.

CARL M. LANGKAMMERER

It is hereby certified that error appears in the printed specification of the above numbered patent requiring correction as follows:

Column 6, line 21, claim 2, for "2,5-di-aralkylidene-2-hexenedinitrile" read *2,5-di-aralkylidene-3-hexenedinitrile;* and that the said Letters Patent should be read with this correction therein that the same may conform to the record of the case in the Patent Office.

Signed and sealed this 26th day of July, A. D. 1949.

[SEAL]

THOMAS F. MURPHY,
*Assistant Commissioner of Patents.*